United States Patent
Sherlock

(10) Patent No.: US 10,505,858 B2
(45) Date of Patent: Dec. 10, 2019

(54) FABRIC BACK PRESSURE TIMEOUT TRANSMITTING DEVICE

(71) Applicant: Hewlett Packard Enterprise Development LP, Houston, TX (US)

(72) Inventor: Derek Alan Sherlock, Boulder, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 50 days.

(21) Appl. No.: 15/335,878

(22) Filed: Oct. 27, 2016

(65) Prior Publication Data

US 2018/0123966 A1    May 3, 2018

(51) Int. Cl.
*H04L 12/875* (2013.01)
*H04L 12/935* (2013.01)
*H04L 12/733* (2013.01)

(52) U.S. Cl.
CPC ............ *H04L 47/564* (2013.01); *H04L 45/20* (2013.01); *H04L 49/3009* (2013.01)

(58) Field of Classification Search
CPC .... H04L 47/564; H04L 45/20; H04L 49/3009
See application file for complete search history.

(56) References Cited

U.S. PATENT DOCUMENTS

| | | | | |
|---|---|---|---|---|
| 6,052,375 A * | 4/2000 | Bass | ........................ | H04L 47/10 370/230.1 |
| 7,023,857 B1 * | 4/2006 | Chiussi | .................... | H04L 47/39 370/236 |
| 7,843,817 B2 | 11/2010 | Gong et al. | | |
| 2003/0174652 A1 * | 9/2003 | Ebata | ...................... | H04L 45/00 370/235 |
| 2005/0030894 A1 * | 2/2005 | Stephens | ................. | H04L 47/10 370/230 |
| 2006/0045011 A1 * | 3/2006 | Aghvami | ................ | H04L 47/10 370/230 |

(Continued)

FOREIGN PATENT DOCUMENTS

WO    WO2014167550    10/2014

OTHER PUBLICATIONS

Bhorkar, A.A. et al., Achieving Congestion Diversity in Wireless Ad-hoc Networks, viewed onhttp://cseweb.ucsd.edu/~snoeren/papers/cdp-infocom11.pdf, on Jan. 7, 2016.

(Continued)

*Primary Examiner* — Ivan O Latorre
(74) *Attorney, Agent, or Firm* — Hewlett Packard Enterprise Patent Department

(57) ABSTRACT

A fabric back pressure timeout transmitting device may include an arbiter, a first queue to supply packets to the arbiter and a second queue to supply packets to the arbiter, a first timer tracking time since transmission of a packet from the first queue with at least one packet in the first queue and a second timer tracking time since transmission of a packet from the second queue with at least one packet in the second queue. The first queue is designated to receive those packets that have a first number of remaining to destination hops. The second queue is designated to receive those packets that have a second number of remaining destination hops different than the first number.

17 Claims, 4 Drawing Sheets

(56) References Cited

U.S. PATENT DOCUMENTS

| | | | | |
|---|---|---|---|---|
| 2006/0101178 A1* | 5/2006 | Zhong | ............... | G06F 13/3625 |
| | | | | 710/112 |
| 2006/0206579 A1* | 9/2006 | Connor | ................. | H04L 47/10 |
| | | | | 709/214 |
| 2007/0002740 A1* | 1/2007 | Evans | .................. | H04L 45/20 |
| | | | | 370/230.1 |
| 2008/0256272 A1* | 10/2008 | Kampmann | ...... | H04L 29/06027 |
| | | | | 710/57 |
| 2009/0296704 A1* | 12/2009 | Kim | ..................... | H04L 45/20 |
| | | | | 370/389 |
| 2010/0023655 A1* | 1/2010 | Hirayama | ............. | G06F 3/061 |
| | | | | 710/33 |
| 2010/0265955 A1* | 10/2010 | Park | ..................... | H04L 45/00 |
| | | | | 370/400 |
| 2012/0147746 A1* | 6/2012 | Shaffer | ............... | H04L 47/122 |
| | | | | 370/235 |
| 2012/0155264 A1* | 6/2012 | Sharma | ............. | H04L 43/0852 |
| | | | | 370/232 |
| 2013/0286825 A1* | 10/2013 | Sherlock | ............... | H04L 47/33 |
| | | | | 370/230 |
| 2014/0146666 A1* | 5/2014 | Kwan | ................... | H04L 47/12 |
| | | | | 370/230 |
| 2015/0382275 A1 | 12/2015 | Pragada et al. | | |

OTHER PUBLICATIONS

Shukla, U. K. et al., Backpressure Policies for Wireless Ad Hoc Networks Mar. 16, 2010 (http://scholar.lib.vt.edu/theses/available/etd-04272010-143912/unrestricted/ushukla_thesi.

* cited by examiner

FABRIC BACK PRESSURE TIMEOUT TRANSMITTING DEVICE

BACKGROUND

Fabric-based computer systems transmit data, in the form of packets, to various destination nodes across links and switches. Addressing failures in the fabric, especially in nonhierarchical fabric topologies, may be costly and difficult.

DETAILED DESCRIPTION OF EXAMPLES

In a packet-switched fabric, packets are passed between endpoints across multiple multi-hop routes, across many links and switches. A "hop" refers to the transfer of a packet (or flow control digit (flit)) across a link between components such as between either a source and a switch or between consecutive switches. For purposes of this disclosure, the term "packet" encompasses both packets and their smaller pieces, such as flits. If any fabric component along a route fails, components upstream of the failed component may not receive credits and may be unable to transmit or forward packets. Once the queue of the upstream component fills, the upstream component itself may no longer be able to issue credits, resulting in a further upstream component being unable to transmit or forward packets. As a result, traffic back pressure occurs not only at the link immediately proximate to a failed component, but may also occur at more remote upstream links.

To address such back pressure, prior packet-switched fabrics have utilized hierarchical back pressure timer thresholds, wherein a queue is emptied of packets in response to packets no longer being transmitted from the queue for a predetermined timeout threshold and wherein queues progressively farther away from the end of routes have larger timeout thresholds. However, the use of such hierarchical back pressure timer thresholds in existing devices presupposes a physical topology that is closely related to the hierarchy of the fabric end-to-end routes. In other words, each link of a route has a fixed distance, number of hops, to the end of the route.

In nonhierarchical topologies, where co-mingled traffic on a given link may be shared between multiple end-to-end routes, each link may not have a fixed distance, number of hops, to the end of the route. As a result, the hierarchy of back pressure timer thresholds amongst the different links of the fabric cannot be established. Thus, existing devices and techniques are not well suited for addressing back pressure in non-hierarchical topologies.

Figure 1:
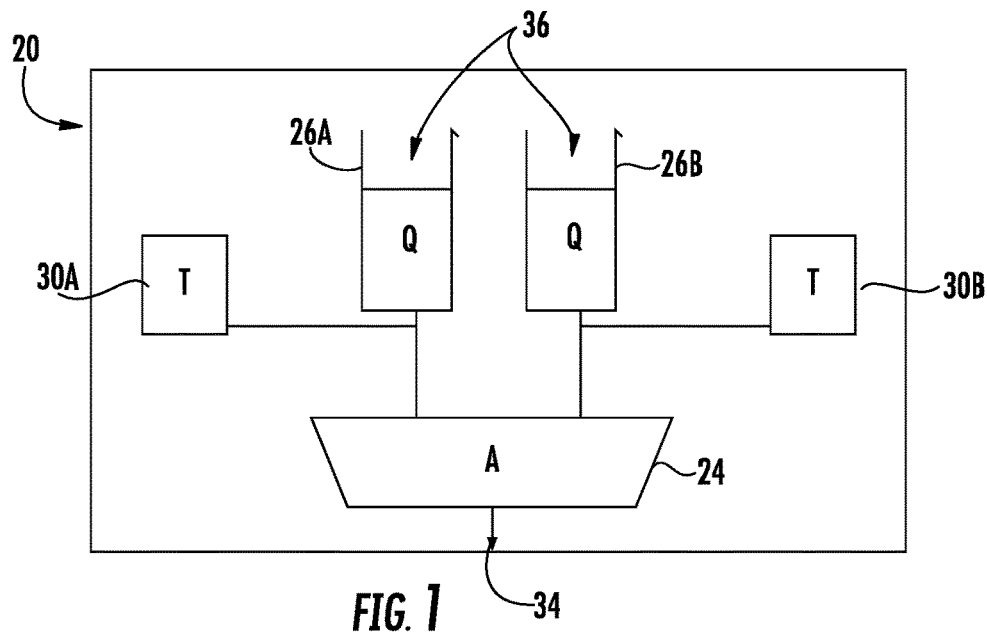
FIG. 1 is a schematic diagram of a portion of an example fabric back pressure timeout transmitting device for a fabric having a nonhierarchical topology.

FIG. 1 schematically illustrates a portion of an example fabric back pressure timeout transmitting device 20. In contrast to the prior back pressure relieving devices described above, device 20 is especially suited for relieving back pressure in a non-hierarchical packet-switched fabric. Device 20 may comprise a switch (also sometimes referred to as a crossbar) or a packet source such as a processing chip. Device 20 comprises queues designated to receive those received packets that have a predefined number of remaining to destination hops, wherein an individual queue is automatically emptied of queued packets, which are discarded, in response to packets not being transmitted from the individual queue for a predefined period of time.

As shown by FIG. 1, the portion of device 20 illustrated comprises arbiter 24, queues 26A, 26B (collectively referred to as queues 26) and timers 30A, 30B, collectively referred to as timers 30). Arbiter 24 comprises electronic hardware or circuitry that selects one of several input signals and forwards the selected input signal to a single output. Arbiter 26 determines from which of queues 26 a packet is to be transmitted and forwarded to output or transmitter 34. In one implementation, arbiter 24 may comprise a multiplexer.

Queues 26 comprise memory buffers that temporarily store data packets awaiting arbitration or forwarding to transmitter 34 by arbiter 24. Queues 26 are each designated to receive those packets having a predefined number of remaining to destination hops. The "remaining to destination hops" refers to the number of hops or links that a packet has yet to traverse before reaching its assigned or designated final destination. Queue 26A is designated to receive and temporarily store those packets received by device 20 that have a first predefined number of remaining to destination hops. Queue 26B is designated to receive and temporarily store those packets received by device 20 that have a second predefined number of remaining to destination hops, the second number being different than the first number. As packets are received by device 20, the packets are forwarded to either queue 26A or queue 26B depending upon the final destination of the individual packet.

The number of queues served by arbiter 24 and its corresponding output 34 equals the number of possible remaining to destination hops from output 34 of device 20. In the example illustrated, all destinations reachable from device 220 have either a first number of remaining to destination hops or a second number of remaining two-destination hops. In one implementation, queue 26A may contain all packets having a single remaining to-destination hop while queue 26B contains all packets having two remaining to destination hops. In other implementations, queues 26 may contain packets having remaining to destination hops other than a single hop and a double hop. For example, in some implementations, all of the destinations reachable from output 34 may be reachable in either three hops or five hops. In such an implementation, queue 26A may be designated to contain those packets having three remaining to destination hops while queue 26B may be designated to contain those packets having five remaining to destination hops.

Timers 30 each comprise timeout hardware circuitry that tracks the time since transmission of a packet from the associated one of queues 26, while at least one packet is stored in the associated one of queues 26. In one implementation, each of timers 30 may count up towards a predefined threshold. In another implementation, each of timers 30 may count down from a predefined threshold or timeout value. Once a packet is transmitted from the associated one of queues 26, or in response to the associated one of queues 26 being empty, the particular timer 30 is reset. Each of timers 30 has an associated timeout value that when satisfied, automatically results in the associated queue 26 being emptied, all of the packets presently residing the associated queue and those subsequently received by the particular associated queue being discarded such that the particular associated queue becomes "bit bucket".

Timers 30 may each have a different timeout value or timeout threshold based upon the remaining to destination hops designated for the associated queue 26. For example, in implementations where queue 26A is designated to receive packets having a smaller number of remaining to destination hops as compared to queue 26B, timer 30A may also have a smaller bit bucket triggering timeout duration, a timeout value or threshold that may be more quickly satisfied.

Although FIG. 1 illustrates the portion of device 20 as comprising two queues 26 and two associated timers 30, the number of queues and associated timers 30 associated with an individual output or transmitter 34 of device 20 may depend upon the maximum number of different remaining non-zero to destination hop values for the particular output or transmitter 34. For example, if there are y different possible remaining to destination hop values for a packet being transmitted by transmitter 34, device 20 may also have a y number of queues 26 and respective timers 30. By way of a more specific example, if all of the destinations reachable from transmitter 34 are either 1 hop, 2 hops, 3 hops, 4 hops or 6 hops away, device 20 would have, at minimum, five different queues for the transmitter 34: a first queue for the one hop distance, a second queue for the 2 hops distance, a third queue for the 4 hops distance and a fourth queue for the 6 hops distance.

Although FIG. 1 illustrates a portion of device 20 as comprising a single output or transmitter 34 with the associated single arbiter 24 and a single input 36, device 20 may include a greater number of inputs 36 as well as a greater number of outputs 34 and associated arbiters 24. For example, although not specifically illustrated in FIG. 1, device 20 may additionally comprise an additional output 34, an additional arbiter 24 and an additional input 36, wherein the additional arbiter arbiters packets from an additional set of queues and associated timers. In such an implementation, the queues of the additional set of queues would have similar remaining to destination hop designations as queues 26 and their additional associated timers would have similar timeout values as timers 30.

Figure 2:
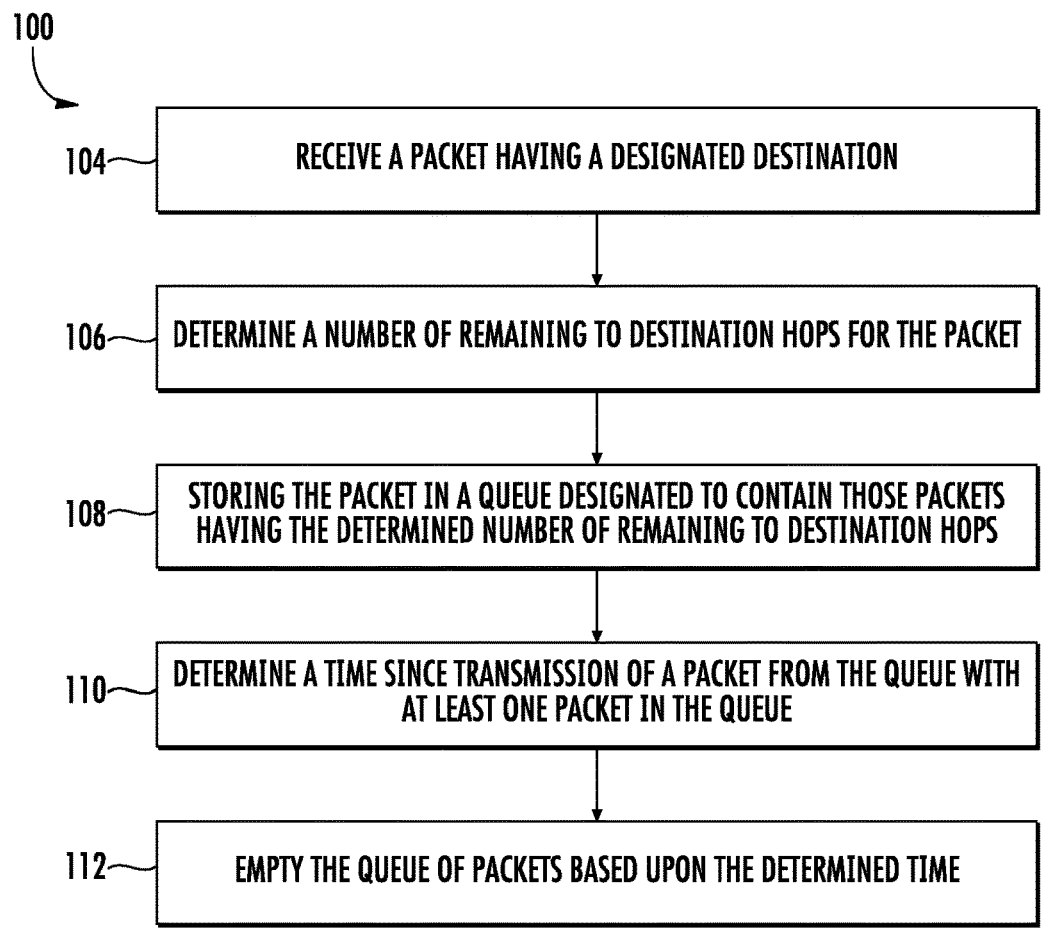
FIG. 2 is a flow diagram of an example method for relieving back pressure in a communications fabric having a nonhierarchical topology.

FIG. 2 is a flow diagram of an example method 100 that may be carried out by the example device 20 or any of the other devices described hereafter. As indicated by block 104, device 20 received a packet having a designated final destination.

As indicated by block 106, device 20 determines the number of remaining to destination hops for a packet. In one implementation, when the packet is received, its header is read to determine the final destination of the packet. The final destination is then used to determine the number of remaining to destination hops for the packet. In one implementation, device 20 has a non-transitory memory storing different remaining to destination hops for different possible final destinations. In one implementation, device 20 comprises a lookup table storing different remaining to destination hops for different possible final destinations. In one implementation, device 20 comprises a routing table which additionally stores the different remaining to destination hops for different possible final destinations. The table is consulted to determine the number of remaining to destination hops for the packet.

As indicated by block 108, device 20 stores the packet in a queue designated to contain those packets having the determined number of remaining to destination hops. For example, in implementations where queue 26A is designated to contain those packets having a single remaining to destination hop while queue 26B is designated to contain those packets having two remaining to destination hops, a packet having to remaining to destination hops will be stored in queue 26B rather than queue 26A.

As indicated by block 110, device 20 determines a time since forwarding or transmission of a packet from the queue with at least one packet in the queue. With the example device 20 described above, device 20 receives signals from the particular timer 30 corresponding to the particular queue in which the packet was stored, the signals indicating the amount of elapsed time since a packet was last forwarded are transmitted from the particular queue while at least one packet resided in the queue. For example, if the packet was stored in queue 26B, based upon its determined remaining to destination hops, signals from the corresponding timer 30B are evaluated and compared against the timeout threshold or value associated with queue 26B and/or timer 30B.

As indicated by block 112, based upon the comparison of the determined time in block 110, the entire queue of packets in the queue that the packet was stored or was to be stored may be emptied or discarded with the queue converted to a "bit bucket" such that all subsequent packets received by device 20 and assigned to the same queue will also be discarded. For example, in the example being described where the received packet was assigned to queue 26B, all of the presently existing packets residing in queue 26B will be discarded upon the timeout threshold associated with timer 30B and queue 26B being satisfied. Thereafter, all packets received by device 20 and forwarded to queue 26B will also be discarded. As a result, other fabric devices upstream of device 20 may once again begin to transmit or forward packets from their respective queues, either to the created "bit bucket" or towards other destinations, relieving congestion and back pressure.

Figure 3:
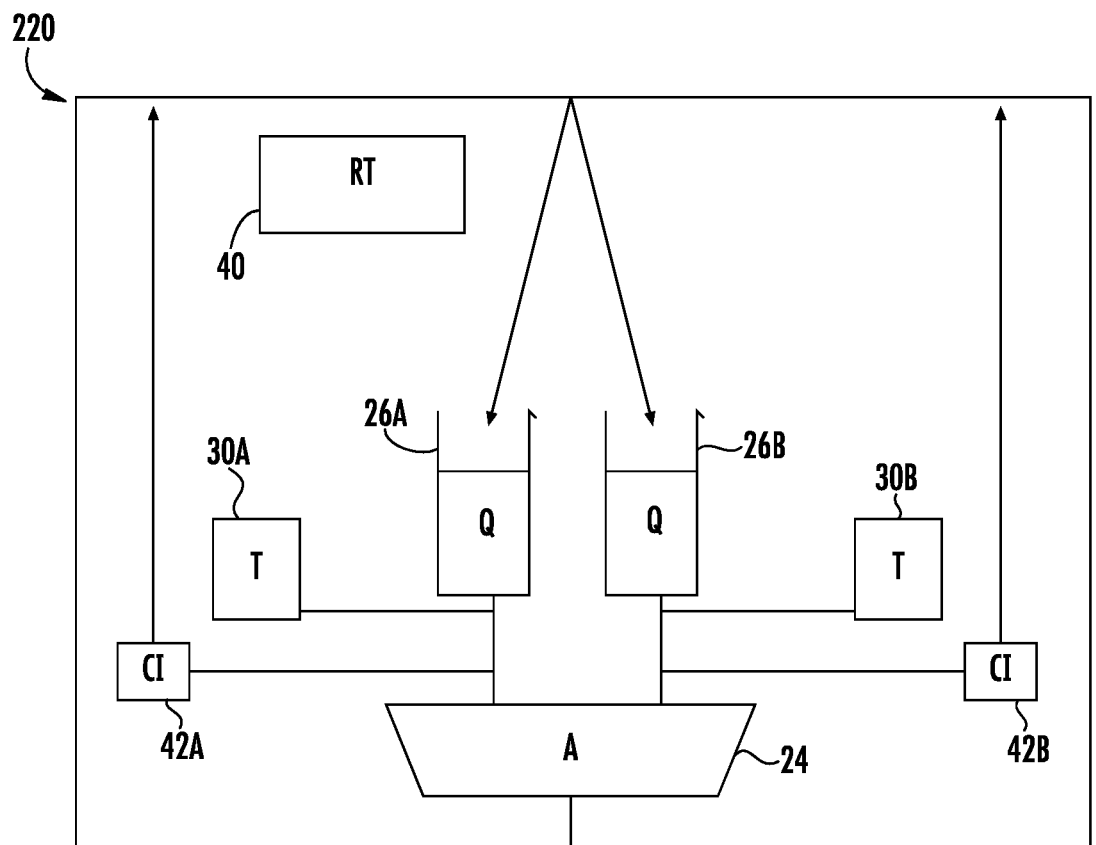
FIG. 3 is a schematic diagram of a portion of an example fabric back pressure timeout transmitting device for a fabric having a nonhierarchical topology.

FIG. 3 schematically illustrates a portion of a fabric back pressure timeout transmitting device 220, an example implementation of device 20 described above. Device 220 is similar device 20 described above except that device 220 additionally illustrated as comprising routing table 40 and credit interfaces 42A, 42B (collectively referred to as credit interfaces 42). Those remaining structures of system 220 which correspond to structures of system 20 are numbered similarly.

Routing table 40 comprises a table of data stored in a memory which is accessed to determine the number of the remaining to destination hops for each packet received by device 220 (per block 106 of method 100 described above with respect to FIG. 2). In implementations where device 220 comprises a multi-output/multi transmitter switch or other multi transmitter component, routing table 40 contains data indicating, based upon the final destination for the packet indicated in the header of the packet, toward what particular transmitter (Transmitter ID) of device 220 the packet should be directed. For example, if a received packet is designated for a final destination serviced by transmitter 34, the packet will be stored in either of queues 26A or 26B, the choice of which depends upon the packet's remaining to destination hops, serviced by arbiter 24 and transmitter 34. Alternatively, if the received packet is designated for final destination serviced by a different transmitter, the packet will be stored in a queue of a different set of queues, the choice of which depends upon the packets remaining to destination hops, serviced by a different arbiter and a different transmitter 34.

In the example illustrated, routing table 40 additionally contains data indicating, based upon the final destination for the packet as indicated in the header of the packet, the remaining to destination hops for the packet. In the example illustrated in FIG. 3, routing table 40 indicates whether the received packet has either a first remaining to-destination hop value or a second remaining to destination hop value which indicates in which of queues 26 the packet should be stored. In other implementations, the routing table 40 may alternatively or additionally contain information indicating a queue designation for the packet (which itself is based upon the remaining to destination hop determined for the packet) based upon the final destination for the packet as indicated in the header of the packet, wherein the packet is automatically stored in the particular queue as dictated by the routing table.

Credit interfaces (CI) 42 interface with upstream devices such as other switches or packet sources. Credit interfaces 42 issue credits to the transmitter of the next adjacent upstream devices authorizing the immediately consecutive upstream devices to send or transmit a packet to device 220. Credit interface 42A issues credits authorizing the upstream transmitter to transmit a packet to device 220 based upon the total number of packet presently contained within queue 26A being less than a predefined threshold, queue 26A is not full. Likewise, Credit interface 42B issues credits authorizing the upstream transmitter to transmit a packet to device 220 based upon the total number of packet presently contained within queue 26B being less than a predefined threshold, queue 26B is not full.

Figure 4:
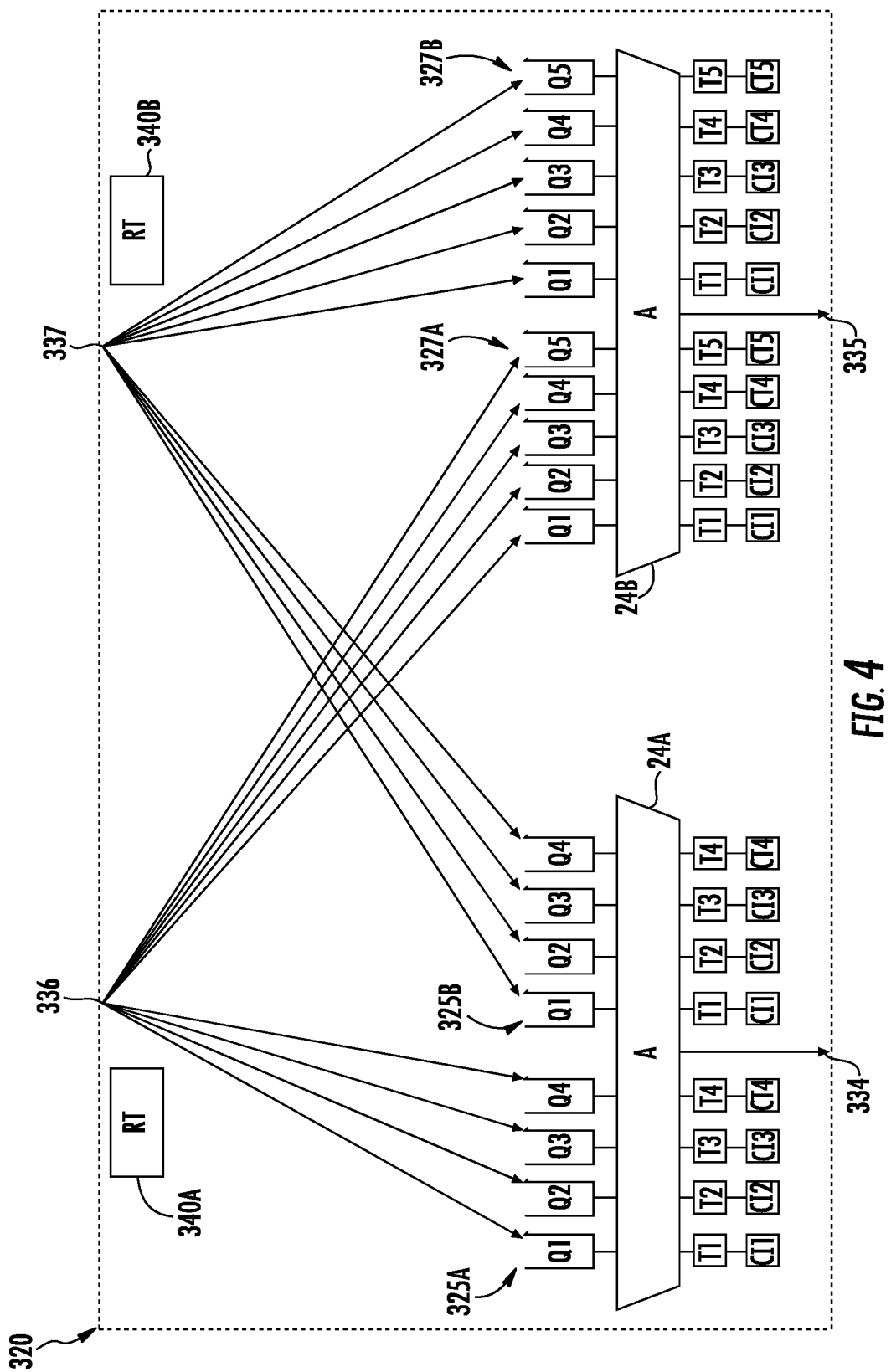
FIG. 4 is a schematic diagram of an example fabric back pressure timeout transmitting device for a fabric having a nonhierarchical topology.

FIG. 4 schematically illustrates fabric back pressure timeout transmitting device 320, an example implementation of device 20 described above. Device 320 is similar to device 220 described above except that device 320 is illustrated as a two-input-to-two-output switch. Device 320 comprises two outputs or transmitters 334, 335 and two inputs 336, 337. Because device 320 comprises two inputs into outputs, device 320 comprises two arbiters 24A and 24B (collectively referred to as arbiters 24) with each of arbiters 24 being associated with two sets of queues 26. Arbiter 24A is associated with sets 325A and 325B of queues 26 while arbiter 24B is associated with sets 327A and 327B of queues 26. The queues 26 of set 325A and set 327A receive packets received through input 336. The queues 26 of set 325B and 327B receive packets received through input 337. In the example illustrated, output or transmitter 334 is connectable to destinations, where each of the destinations is distanced from transmitter 334 by one of four different hop values. As a result, sets 325A and 325B each comprise four different queues, one queue for each of the four different possible hop values. In the example illustrated, output or transmitter 335 is connectable to destinations, where each of the destinations is distanced from transmitter 335 by one of five different hop values. As a result, sets 327A and 327B each comprise five different queues, one queue for each of the five different possible hop values. In the example illustrated, the four queues of set 325A and 325B are designated to receive those packets having 1, 2, 3 and 4 remaining to destination hops, respectively. The five queues of sets 327A and 327B are designated to receive those packets having one, 2, 3, 4 and 5 remaining to destination hops, respectively. Each queue has an associated timer 30 and credit interface 42.

Figures 5, 6:
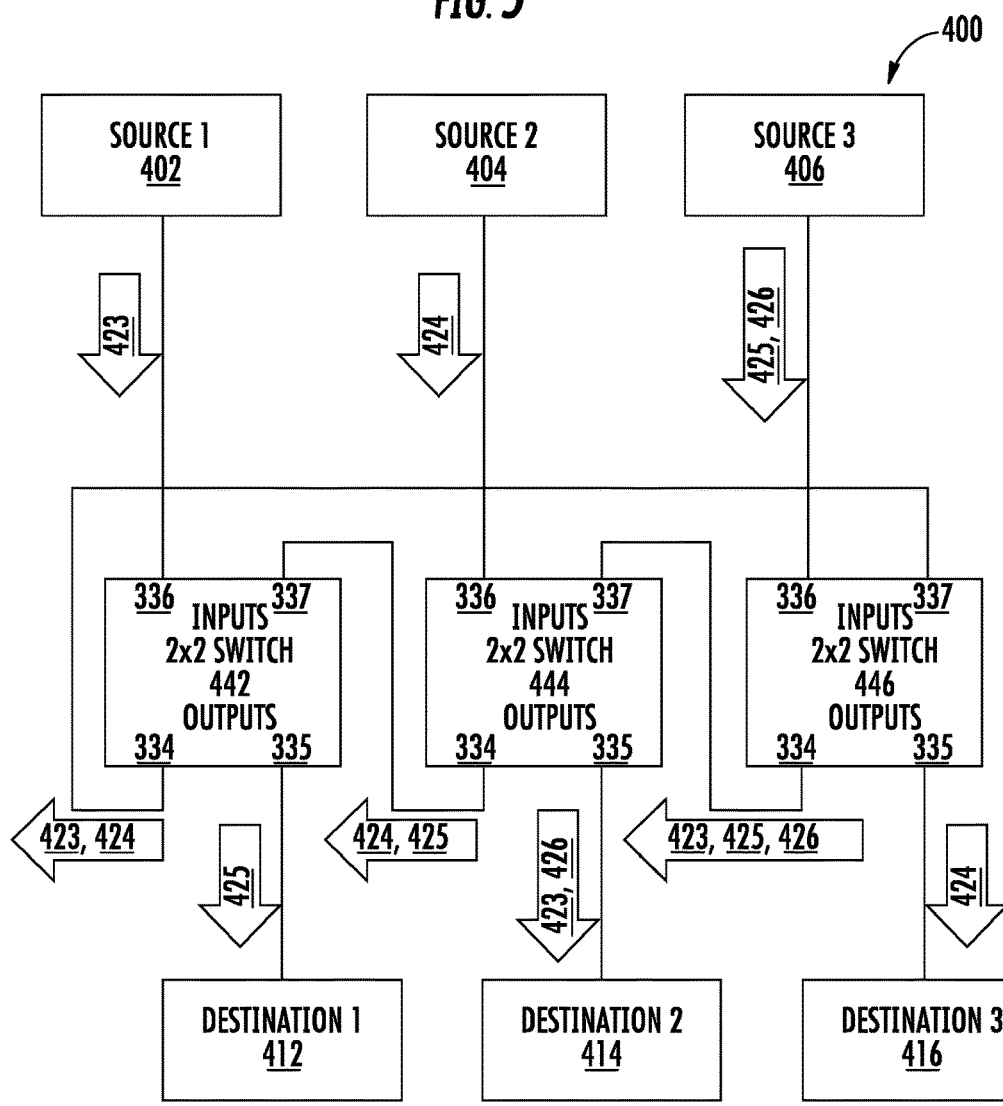
FIG. 5 is a diagram of an example routing table for the example device of FIG. 4.
FIG. 6 is a diagram of an example communications fabric comprising example fabric back pressure timeout transmitting devices.

In the example illustrated, each of inputs 336, 337 has an associated routing table 340A, 340B. FIG. 5 is a diagram illustrating one example of routing table 340A for those packets received the input 336. As shown by FIG. 4, for each final packet destination D1-Dn, routing table 340 contains data indicating the corresponding routing path (transmitter ID) for the packet as well as the corresponding remaining to destination hops and/or designated queue for the packet. The routing path/transmitter ID indicates to which set of queues 26 that the packet should be forwarded. The remaining to destination hops corresponding the final packet destination indicates to which of the individual queues 26 of the particular set of queues that the packet should be sent. For example, packets to be transmitted to final destinations D1 are to be forwarded towards transmitter 334. Since the packet is received at input 336, the packet will be transmitted to one of queues 325A associated with transmitter 334. Because the packet is to be transmitted to a final packet destination D1 have a remaining to destination hops value of 1, as indicated by routing table 340, the packet is to be forwarded to Q1 of the packet set 325A. Likewise, packets to be transmitted to final destinations Dn are to be forwarded towards transmitter 335. Since the packet is received at input 336, the packet will be transmitted to one of queues 327A associated with transmitter 335. Because the packet is to be transmitted to a final packet destination Dn have a remaining to destination hops value of 5, as indicated by routing table 340, the packet is to be forwarded to Q5 of the packet set 327A. The routing table 340 is similar to routing table 340A except that routing table 340B directs packets to either sets 325B or 327B depending upon the transmitter ID for the final packet destination, wherein the particular queue of either of sets 325B or 327B to which the packet is sent depends upon the remaining to destination hops for the packet.

FIG. 6 illustrates one example of how communications fabric 400, comprising switches 442, 444, 446, routing packets from sources 402, 404 and 406 to destinations 412, 414, and 416, may relieve back pressure of packets resulting from a failed component despite the non-hierarchical topology of fabric 400. Switches 442, 444, and 446 each represent an instance of the fabric back pressure timeout transmitting device (detailed as 320 in FIG. 4), behaving as a 2×2 (i.e. 2-input 2-output) switch. The specific interconnect topology shown, as well as the choice of two-input, two-output switches is illustrative only. Other topologies, and topologies using switches with higher numbers of inputs and/or outputs, would be equally applicable.

FIG. 6 also shows packet streams 423, 424, 425, and 426 proceeding from sources 402, 404, and 406, to destinations 412, 414, and 416. The topology presented in FIG. 6 is "non-hierarchical" in the sense that it comingles traffic on links in such a manner as to preclude the use of simple hierarchical timeout settings to unambiguously detect the links that directly drive failed components that are not returning credits. This is best understood by considering the constraints upon correct timeout threshold selection assuming this topology were built with ordinary input- or output-queued switches, rather than instances of the backpressure timeout transmitting devices. Consider the failure of switch 442 in a manner where it ceases returning credits on its input links, in the presence of traffic 425. In this event, both switches 444 and 446 would experience back-pressure on their outputs 334. Of course, all packets depending upon the failed switch 442 will cease to be delivered successfully, including all of those in streams 423, 424, and 425. However, proper fault isolation should allow streams of traffic that do not depend upon the failed switch 442, such as packets in stream 426, to continue to be delivered normally. To ensure this, only the output proximal to the point of failure detects the failure and discards packets, while other switch outputs experiencing the resulting backpressure indirectly do not. When using only hierarchical timeouts to achieve this, a lower timer threshold is used on output 334 of switch 444 than on output 334 of switch 446, to ensure that output 334 of switch 444 begins discarding packets in time to prevent a timeout from occurring at output 334 of switch 446. If output 334 of switch 446 were instead to reach its timer threshold first or concurrently with output 334 of switch 444, causing switch 446 to begin discarding current and future packets bound for output 334, then the flow of packets in stream 426 would also be interrupted. This would be an incorrect outcome, since the route taken by packets 426 does not in any way depend upon the failed switch 442, and thus should not be interrupted by its failure.

Thus, considering the failure of switch 442 in the presence of traffic 425 leads to the conclusion that output 334 of switch 446 requires a higher timer threshold than output 334 of switch 444. By symmetry, an analysis of a failure of switch 444 in the presence of traffic 423 leads to the conclusion that output 334 of switch 442 requires a higher timer threshold than output 334 of switch 446, and an analysis of a failure of switch 446 in the presence of traffic 424 leads to the conclusion that output 334 of switch 444 requires a higher timer threshold than output 334 of switch 442. Since these three constraints are not mutually compatible, there is no one correct set of timer thresholds that can correctly handle all three scenarios. This illustrates why simple hierarchical timers alone are inadequate for this topology, and that the fabric back pressure timeout transmitting device is required instead.

Now consider the same scenario, but now with switches 442, 444, and 446 implemented as instances of the fabric back pressure timeout transmitting device detailed as 320 in FIG. 4.

Packets 423 from source 402 having a designated final destination 414 enter switch 442 at input 336. Switch 442 consults routing table 340A and transmits the received packets to Q3 of queue set 325A as the packet is destined for destination 414 and has three remaining to destination hops. At input 337 of switch 446, switch 446 consults routing table 340B and transmits the received packets to Q2 of queue set 325A as the packet is destined for destination 414 and has two remaining to destination hops. At input 337 of switch 444, switch 444 consults routing table 340B and transmits the received packets to Q1 of queue set 327B as the packet is destined for destination 414 and has one remaining to destination hops.

Packets 424 from source 404 having a designated final destination 416 enter switch 444 at input 336. Switch 444 consults routing table 340A and transmits the received packets to Q3 of queue set 325A as the packet is destined for destination 416 and has three remaining to destination hops. At input 337 of switch 442, switch 442 consults routing table 340B and transmits the received packets to Q2 of queue set 325A as the packet is destined for destination 416 and has two remaining to destination hops. At input 337 of switch 446, switch 446 consults routing table 340B and transmits the received packets to Q1 of queue set 327B as the packet is destined for destination 416 and has one remaining to destination hops.

Packets 425 from source 406 having a designated final destination 412 enter switch 446 at input 336. Switch 446 consults routing table 340A and transmits the received packets to Q3 of queue set 325A as the packet is destined for destination 412 and has three remaining to destination hops. At input 337 of switch 444, switch 444 consults routing table 340B and transmits the received packets to Q2 of queue set 325A as the packet is destined for destination 412 and has two remaining to destination hops. At input 337 of switch 442, switch 442 consults routing table 340B and transmits the received packets to Q1 of queue set 327B as the packet is destined for destination 412 and has one remaining to destination hops.

Now consider the packets stored in the various queues 325A associated with output 334 of switch 442, which is implemented as an instance of the fabric back pressure timeout transmitting device detailed as 320 in FIG. 4. Queue Q2 contains packets from stream 424, governed by credit interface CI2 and timed by timer T2, and queue Q3 contains packets from stream 423, governed by credit interface CI3 and timed by timer T3. Similarly, in switch 444 associated with output 334, queue Q2 contains packets from stream 425, governed by credit interface CI2 and timed by timer T2, and queue Q3 contains packets from stream 424, governed by credit interface CI3 and timed by timer T3. Similarly, in switch 446 associated with output 334, queue Q2 contains packets from stream 423, governed by credit interface CI2 and timed by timer T2, and queue Q3 contains packets from stream 425, governed by credit interface CI3 and timed by timer T3. No single queue in any switch contains co-mingled packets with different numbers of remaining hops to destination, and so no packets with different numbers of remaining hops to destination share a common control interface or timer. Since credit interfaces and timers are now separated by remaining hop count to destination, it is now possible to set choose hierarchical timer thresholds despite the non-hierarchical topology.

As before, consider the failure of switch 442 in a manner where it ceases returning credits on its input links, in the presence of traffic 425. Hierarchical timer settings are now used, with the lowest time threshold set for all T1 timers in all outputs 334, 335 of all switches 442, 444, 446, and progressively higher timer thresholds used for T2 timers, T3 timers, T4 timers, etc.

The failure of switch 442 to return credits at its input 337 causes backpressure at switch 444 which prevents packet streams 424 and 425 from making forward progress. Associated with output 334 of switch 444, timers T2 and T3 run. The blockage of packets stream 425 fills queue Q2, resulting in switch 444 no longer being able to return credits at input 337 to switch 446. The failure of switch 444 to return credits at its input 337 causes backpressure at switch 446 which prevents packet streams 425 from making forward progress. Associated with output 334 of switch 446, timer T3 runs. However, packets in stream 423 are not affected by the backpressure reaching switch 446, because of the independent credit interfaces for queues Q2 and Q3 of queue set 325A. For this reason, timer T2 does not run.

Thus, although multiple timers in multiple components are running as a result of the failure of switch 202, timer T2 associated with Q2 of queue set 335B of switch 444 is guaranteed to reach its threshold first, since all others have higher timeout thresholds. Upon the timeout threshold being satisfied, the previously received packets and all the packets contained within all queues associated with output 334 of switch 444 are emptied or discarded. All queues associated with output 334 of switch 444 becomes a bit buckets such that any future subsequent packets received by them are also discarded, including all packets within streams 424 and 425. Credits return resumes from switch 444 input 337, preventing the spurious occurrence of any timeouts in output 334 of switch 446 or any further-upstream switches. Packet stream 426 continues uninterrupted, as it should since it does not depend upon the filed switch 442.

In the example illustrated, each of switches 442, 444, 446 is illustrated as having two queue sets 325A and 325B for transmitter 334, each having four queues, and two queue sets 327A, 327B for transmitter 335, each having five queues. In such an implementation, transmitter 334 may be spaced from destinations by up to four different hop counts. Transmitter 335 may be spaced from destinations by up to five different hop counts. In other implementations, each of the switches may have the same number of queues for each transmitter, the number being at least as large as the greatest number of possible different hop counts from any device, source or switch, across the entire fabric 400. In yet other implementations, each of the devices, sources and/or switches may have a sets of queues with different number of queues, wherein the number of queues within each set vary from transmitter to transmitter, depending upon the actual number of different possible hop counts to any destination from the particular transmitter.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A fabric back pressure timeout transmitting device comprising:
   an arbiter;
   a first queue to supply packets to the arbiter, the first queue being designated to receive those packets that have a first number of remaining to destination hops;
   a second queue to supply packets to the arbiter, the second queue being designated to receive those packets that have a second number of remaining destination hops different than the first number;
   a first timer tracking time since transmission of a packet from the first queue with at least one packet in the first queue, wherein multiple packets are removed from the first queue to completely empty the first queue in response to satisfaction of a first timeout value of the first timer; and
   a second timer tracking time since transmission of a packet from the second queue with at least one packet in the second queue, wherein multiple packets are removed from the second queue to completely empty the second queue in response to satisfaction of a second timeout value of the second timer
   wherein upon the first timeout value of the first queue being satisfied, packets subsequently received by the first queue are discarded.

2. The fabric back pressure timeout transmitting device of claim 1 further comprising:
   a first credit interface associated with the first queue to issue credits for the first queue; and
   a second credit interface associated with the second queue to issue credits for the second queue.

3. The fabric back pressure timeout transmitting device of claim 1 further comprising a routing table having an entry for a destination, the entry comprising:
   a transmitter identification; and
   at least one of a number of remaining to destination hops for the destination and a queue designation based upon the number of remaining to destination hops for the destination.

4. The fabric back pressure timeout transmitting device of claim 1, wherein the first number of remaining to destination hops is greater than the second number of remaining to destination hops, wherein the first timer has a first timeout value and wherein the second timer has a the second timeout value is less than the first timeout value, wherein packets in the first queue are emptied from the first queue in response to the first timeout value being reached by the first timer and wherein packets in the second queue are emptied in response to the second timeout value being reached by the second timer.

5. The fabric back pressure timeout transmitting device of claim 1, wherein the fabric transmitting device is selected from a group of fabric transmitting devices consisting of: a switch and a processing chip.

6. The fabric back pressure timeout transmitting device of claim 1, wherein the fabric transmitting device is designated for a maximum number of remaining to destination hops and wherein the fabric transmitting device comprises a number of queues, including the first queue and the second queue, equal to the maximum number of remaining to destination hops designated for the fabric transmitting device.

7. The fabric back pressure timeout transmitting device of claim 1, wherein the fabric transmitting device is for use with a fabric having a maximum number of remaining to destination hops and wherein the fabric transmitting device comprises a number of queues, including the first queue and the second queue, equal to the maximum number of remaining to destination hops of the fabric.

8. The device of claim 1, wherein no single queue in the device is to contain co-mingled packets having different numbers of remaining to destination hops.

9. The fabric back pressure timeout transmitting device of claim 1, wherein the multiple packets removed from the first queue and the multiple packets removed from the second queue are discarded.

10. A fabric back pressure timeout method comprising:
    receiving a packet having a designated destination;
    determining a number of remaining to destination hops for the packet;
    storing the packet in a queue designated to contain those packets having the determined number of remaining to destination hops;
    determining a time since transmission of a packet from the queue with at least one packet in the queue; and
    emptying the queue of packets based upon the determined time discarding packets received by the queue subsequent to the emptying of the queue based upon the prior emptying of the queue that was based upon the determined time.

11. The fabric back pressure timeout method of claim 10 further comprising:
receiving a second packet having a second designated destination;
determining a second number of remaining to destination hops for the second packet;
storing the second packet in a second queue designated to contain those packets having the determined second number of remaining to destination hops;
determining a second time since transmission of a packet from the second queue with at least one packet in the second queue; and
emptying the second queue of packets based upon the determined second time.

12. The fabric back pressure timeout method of claim 11, wherein the first queue is emptied of packets based upon the determined time satisfying a first timeout value and wherein the second queue is emptied of packets based upon the determined second time satisfying a second timeout value different than the first timeout value.

13. The fabric back pressure timeout method of claim 12 wherein the number of remaining to destination hops is greater than the second number of remaining to destination hops and wherein the first timeout value is greater than the second timeout value.

14. The fabric back pressure timeout method of claim 10, wherein the packets emptied from the queue based upon the determined time are discarded.

15. A nonhierarchical multi-hop packet-switched fabric comprising:
a first fabric back pressure timeout transmitting device comprising:
a first arbiter;
a first queue to supply packets to the first arbiter, the first queue being designated to receive those packets that have a first number of remaining to destination hops;
a second queue to supply packets to the first arbiter, the second queue being designated to receive those packets that have a second number of remaining destination hops different than the first number;
a first timer tracking time since transmission of a packet from the first queue with at least one packet in the first queue, wherein multiple packets are removed from the first queue to completely empty the first queue in response to satisfaction of a first timeout value of the first timer; and
a second timer tracking time since transmission of a packet from the second queue with at least one packet in the second queue, wherein multiple packets are removed from the second queue to completely empty the second queue in response to satisfaction of a second timeout value of the second timer; and
a second fabric back pressure timeout transmitting device comprising:
a second arbiter;
a third queue to supply packets to the second arbiter, the third queue being designated to receive those packets that have the first number of remaining to destination hops;
a fourth queue to supply packets to the second arbiter, the fourth queue being designated to receive those packets that have the second number of remaining destination hops different than the first number;
a third timer tracking time since transmission of a packet from the third queue with at least one packet in the third queue, wherein multiple packets are removed from the third queue to completely empty the third queue in response to satisfaction of a third timeout value of the third timer; and
a fourth timer tracking time since transmission of a packet from the fourth queue with at least one packet in the fourth queue, wherein multiple packets are removed from the fourth queue to completely empty the fourth queue in response to satisfaction of a fourth timeout value of the fourth timer;
wherein the first number of remaining to destination hops is greater than the second number of remaining to destination hops, wherein the first timer has a first timeout value and wherein the second timer has a second timeout value less than the first timeout value, wherein packets in the first queue are emptied from the first queue in response to the first timeout value being reached by the first timer and wherein packets in the second queue are emptied in response to the second timeout value being reached by the second timer.

16. The fabric of claim 15, wherein the second fabric back pressure timeout transmitting device further comprises:
a first credit interface to issue credits to the first queue; and
a second credit interface to issue credits to the second queue.

17. The fabric of claim 15, wherein the second fabric back pressure timeout transmitting device further comprises a routing table having an entry for a destination, the entry comprising:
a transmitter identification; and
at least one of (1) a number of remaining to-destination hops for the destination and (2) a queue designation designating one of the third queue and the fourth queue based upon the number of remaining to destination hops for the destination.

* * * * *